United States Patent Office 3,341,338
Patented Sept. 12, 1967

3,341,338
POLYSILOXANE POLISH FORMULATIONS
Anton S. Pater, Williamsville, N.Y., assignor to Union Carbide Corporation, a corporation of New York
No Drawing. Filed May 28, 1965, Ser. No. 459,902
12 Claims. (Cl. 106—10)

This application is a continuation-in-part of application Ser. No. 168,503 filed Jan. 24, 1962, now abandoned.

This invention relates to polish formulations which contain organopolysiloxanes. More particularly, the invention is directed to improved polish formulations which contain a hydrolytically stable polysiloxane-oxyalkylene block copolymer.

Polish formulations containing organopolysiloxanes have been in use for several years, but known formulations have been subject to several disadvantages, for example the tendency for the polish ingredients to migrate from painted surfaces to nearby glass or metal surfaces, and difficulty in repainting a surface after application of the polish.

It is an object this invention to provide polysiloxane containing polish formulations free from the disadvantages of formulations heretofore known. Another object of this invention is to provide film-forming polish formulations for metallic, painted, varnished, or lacquered surfaces which contain hydrolytically stable polysiloxane-oxyalkylene block copolymers. A further object of this invention is to provide a polish which contains a wax, a hydrolytically stable polysiloxane-oxyalkylene block copolymer and, optionally, an abrasive cleanser. Other objects and advantages of this invention will be apparent from the following description and appended claims.

The polish formulations of this invention contain (A) as the sole polysiloxane constituent, from about 0.1 to about 98 weight percent (preferably from 0.1 to 20 weight percent) of a hydrolytically stable polysiloxane-oxyalkylene block copolymer, (B) from about 2 to about 50 weight percent (preferably from 2 to 25 weight percent) of a wax, and (C) from about 0 to about 99 weight percent (preferably from 55 to 97.9 weight percent) of an inert liquid organic compound. The term "inert" as applied to the organic compound useful in the formulations of this invention means that the solvent does not (to any significant extent) dissolve, react with or otherwise attack the metallic, painted, varnished, or lacquered surface to which the polish formulation is applied.

The polish formulations of this invention can also contain, as optional ingredients, from about 0 to about 30 weight percent of an abrasive cleanser, from about 0 to about 99 weight percent of water and smaller quantities (up to about 15 weight percent) of wetting agents, emulsifying agents, stabilizers and other materials (except other classes of polysiloxanes) conventionally employed in film-forming polish formulations.

The polysiloxane-oxyalkylene copolymers useful in this invention are of the class that are known as "block" copolymers. Block copolymers are composed of at least two sections or blocks, at least one section or block composed of ne type of recurring units or groups (e.g., siloxane units as in the copolymer useful in this invention) and at least one other section or block composed of a different type of recurring units or groups (e.g., oxyalkylene groups as in the copolymers useful in this invention). The copolymers useful in this invention contain one or more siloxane blocks and one or more oxyalklene blocks.

The siloxane blocks in the block copolymers useful in this invention contain at least two siloxane units that are represented by the formula (1) $R_b SiO_{4-b/2}$ wherein R is a monovalent hydrocarbon group, a halogen substituted monovalent hydrocarbon group, or a divalent hydrocarbon group and b has a value from 1 to 3. Preferably each R contains from one to about twenty carbon atoms. The groups represented by R can be the same or different in any given siloxane unit or throughout the siloxane block, and the value of b in the various siloxane units in the siloxane block can be the same or different. The divalent groups represented by R link the siloxane block to the oxyalkylene block. Each siloxane block contains at least one group represented by Formula 1 wherein at least one group represented by R is a divalent hydrocarbon group. The siloxane block has a ratio of hydrocarbon groups to silicon atoms of from 1:1 to 3:1.

Illustrative of the monovalent hydrocarbon groups that are represented by R in Formula 1 are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl and terphenyl groups); the aralkyl groups (for example, the benzyl and the phenylethyl groups); the alkaryl groups (for example, the styryl, tolyl and n-hexylphenyl groups); and the cycloalkyl groups (for example, the cyclohexyl group).

Illustrative of the halogen-substituted monovalent hydrocarbon groups that are represented by R in Formula 1 are the chloromethyl, trichloroethyl, perfluorovinyl, parabromobenzyl, iodophenyl, alpha-chloro-beta-phenylethyl, parachlorotolyl and bromocyclohexyl groups and the like.

Illustrative of the divalent hydrocarbon groups represented by R in Formula 1 are the alkylene groups (such as the methylene, ethylene, propylene, butylene, 2,2-dimethyl-1,3-propylene, decylene and eicosylene groups), the arylene groups (such as the phenylethylene group). Preferably, the divalent hydrocarbon group is an alkylene group containing from two to four successive carbon atoms. Siloxane groups containing divalent hydrocarbon groups as substituents are illustrated by groups having the formulas:

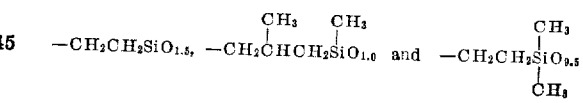

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane units that are represented by Formula 1 wherein either the same hydrocarbon groups are attached to a silicon atom (e.g., the dimethylsiloxy, diphenylsiloxy and diethylsiloxy groups) or different hydrocarbon groups are attached to a silicon atom (e.g., the methylphenylsiloxy, phenylethylmethylsiloxy and ethylvinylsiloxy groups).

The siloxane block in the block copolymers useful in this invention can contain one or more types of siloxane units that are represented by Formula 1 provided that at least one group has at least one divalent hydrocarbon substituent. By way of illustration, only ethylenemethylsiloxy groups

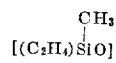

can be present in the siloxane block or the siloxane block can contain more than one type of siloxane group, e.g., the block can contain both ethylene methylsiloxy groups and diphenylsiloxy group, or the block can contain ethylenemethylsiloxy groups, diphenylsiloxy groups and diethylsiloxy groups.

The siloxane block contained in the block copolymers useful in this invention can contain trifunctional siloxane units (e.g., monomethylsiloxane groups, $CH_3SiO_{1.5}$), difunctional siloxane groups (e.g., dimethylsiloxane groups, $(CH_3)_2$—SiO—), monofunctional siloxane units (e.g., trimethylsiloxane units, $(CH_3)_3SiO_{0.5}$), or combinations of these types of siloxane units having the same or different substituents. Due to the functionality of the siloxane groups, the siloxane block can be predominately linear or cyclic or crosslinked or it can have combinations of these structures.

The siloxane block contained in the block copolymers useful in this invention can contain organic end-blocking or chain terminating organic groups as well as the monofunctional siloxane chain terminating groups encompassed by Formula 1. By way of illustration, the siloxane block can contain such organic end-blocking groups as the hydroxyl group, the aryloxy groups (such as the phenoxy group), the alkoxy groups (such as the methoxy, ethoxy, propoxy and butoxy groups), the acyloxy groups such as the acetoxy group, and the like.

The siloxane blocks in the block copolymers useful in this invention each contain at least two siloxane units that are represented by Formula 1. Preferably, the siloxane blocks contain a total of at least five siloxane units that are represented by Formula 1 and by Formula 2 below. That part of the average molecular weight of the copolymer that is attributable to the siloxane blocks can be as high as 50,000 or greater.

A siloxane block can contain, in addition to the groups represented by Formula 1, one or more siloxane units represented by the formula:

(2) 

wherein R has the meaning defined in Formula 1, $e$ has a value from 0 to 2, $f$ has a value from 1 to 2 and $e$ plus $f$ has a value from 1 to 3.

The oxyalkylene blocks in the block copolymers useful in this invention each contain at least two (preferably at least four) oxyalkylene groups that are represented by the formula:

(3) $[-R'O-]$ 

wherein R' is an alkylene group. Preferably, the alkylene group represented by R' in Formula 3 contains from two to about ten carbon atoms, and most preferably from two to three carbon atoms. Illustrative of the oxyalkylene groups that are represented by Formula 3 are the oxyethylene, oxy-1,2-propylene, oxy-1,3-propylene, oxy-2,2-dimethyl-1,3-propylene, oxy-1,10-decylene groups, and the like.

The oxyalkylene blocks in the block copolymer useful in this invention can contain one or more of the various types of oxyalkylene groups represented by Formula 3. By way of illustration, the oxyalkylene blocks can contain only oxyethylene groups or only oxypropylene groups or both oxypropylene groups and oxyethylene groups, or other combinations of the various types of oxyalkylene groups represented by Formula 3.

The oxyalkylene blocks in the block copolymers useful in this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and the allyloxy groups). Also a single group can serve as an end-blocking group for more than one oxyalkylene block. For example, the glyceroxy group

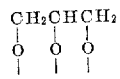

can serve as an end-blocking group for three oxyalkylene chains.

The oxyalkylene blocks in the block copolymers useful in this invention each contain at least two (preferably at least four) oxyalkylene groups that are represented by Formula 3. More preferably, each block contains at least five such groups. That part of the average molecular weight of the copolymer that is attributable to the oxyalkylene blocks can be 50,000 or greater.

The block copolymers useful in this invention can contain siloxane blocks and oxyalkylene blocks in any relative amount. The copolymer can contain, for example, from 5 parts by weight up to 95 parts by weight of siloxane blocks and from 5 parts by weight to 95 parts by weight of oxyalkylene blocks per 100 parts by weight of the copolymer. Preferably, the copolymer contains 5 parts by weight to 50 parts by weight of the siloxane blocks and from 50 parts by weight to 95 parts by weight of the oxyalkylene blocks per 100 parts by weight of the copolymer.

The block copolymers useful in this invention can contain more than one of each of the blocks and the blocks can be arranged in various configurations such as linear, cyclic or branched configurations. By way of illustration, the following classes of compounds are among the siloxane-oxyalkylene block copolymers useful in this invention:

(A) Copolymers that contain at least one unit that is represented by the formula:

(4) 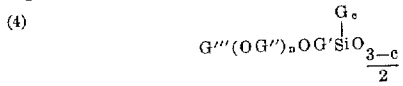

(B) Copolymers that contain at least one unit that is represented by the formula:

(5) 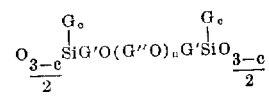

(C) Copolymers that contain at least one unit that is represented by the formula:

(6) 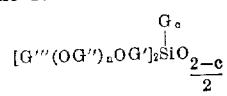

In the above Formulas 4, 5, and 6, G is a monovalent hydrocarbon radical, or halogen-substituted monovalent hydrocarbon radical, G' is a divalent hydrocarbon radical, G" is an alkylene radical containing at least two carbon atoms, G''' is a hydrogen atom or a monovalent hydrocarbon radical free of aliphatic unsaturation, $n$ is an integer having a value of at least two (preferably at least four), and $c$ has a value from 0 to 2 in Formulas 4 and 5 and a value from 0 to 1 in Formula 6. In Formulas 4, 5, and 6, G can represent the same or different radicals, $n$ preferably has a value from 4 to 30 and G" can represent the same or different radicals, i.e., the group $(OG")_n$ can represent, for example, the groups: $-(OC_2H_4)_p-$, $-(OC_2H_4)_p(OC_3H_6)_q-$, $-(OC_3H_6)_p-$ or $-(OC_2H_4)_p(OC_8H_{16})_q-$ where $p$ and $q$ are integers having a value of at least one.

The monovalent hydrocarbon radicals and halogen-substituted monovalent hydrocarbon radicals represented by G in Formulas 4, 5, and 6, can be saturated or olefinically unsaturated and can contain benzenoid unsaturation. Illustrative of the monovalent hydrocarbon radicals represented by G are the linear aliphatic radicals (e.g., the methyl, ethyl, decyl, octadecyl and eicosyl radicals), the cycloaliphatic radicals (e.g., the cyclohexyl and the cyclopentyl radicals), the aryl radicals (e.g., the phenyl, tolyl, xylyl, naphthyl and terphenyl radicals), the aralkyl radicals (e.g., the benzyl and betaphenylethyl radicals), the unsaturated linear aliphatic radicals (e.g., the vinyl, allyl and hexenyl radicals) and the unsaturated cycloaliphatic radicals (e.g., the cyclohexenyl radical).

Illustrative of the halogen-substituted monovalent hydrocarbon radicals represented by G are the chloromethyl, trichloroethyl, perfluorovinyl, para-bromobenzyl, iodophenyl, alpha-chloro-beta-phenylethyl, parachlorotolyl and bromocyclohexyl groups and the like.

Preferably, the G and G' groups [included in the definition of R in Formulas 1 and 2 above] contain from one to twenty carbon atoms and the G'' groups [included in the definition of R' in Formula 3 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 4, 5, and 6, are the alkylene radicals (e.g., the methylene, ethylene, 1,3-propylene, 1,4-butylene, 1,12-dodecylene and 1,20-eicosylene radicals), the arylene radicals (e.g., the phenylene radical), and the alkarylene radicals (e.g., the phenylethylene radicals). In Formulas 4, 5, and 6, G' is preferably an alkylene radical containing at least two carbon atoms.

Illustrative of the alkylene radicals containing at least two carbon atoms represented by G'' in Formulas 4, 5, and 6 are the ethylene, 1,2-propylene, 1,3-propylene, 1,6-hexylene, 2-ethylhexylene-1,6, and 1,10-decylene radicals.

Illustrative of the radicals represented by G''' in Formulas 4, 5, and 6 are the saturated linear or branched chain aliphatic hydrocarbon radicals (e.g., the methyl, ethyl, propyl, n-butyl, tert.-butyl, and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

The following are representative of the hydrolytically stable siloxane-oxyalkylene block copolymers useful in this invention. In the formulas, Me represents methyl ($CH_3$), Et represents ethyl ($CH_3CH_2$), Bu represents n-butyl ($CH_3CH_2CH_2$), $\phi$ represents phenyl ($C_6H_5$), and $x$ is an integer. Where the formula represents a unit of a polymer, it is understood that the polymer is terminated by end-blocking groups of the type described hereinabove.

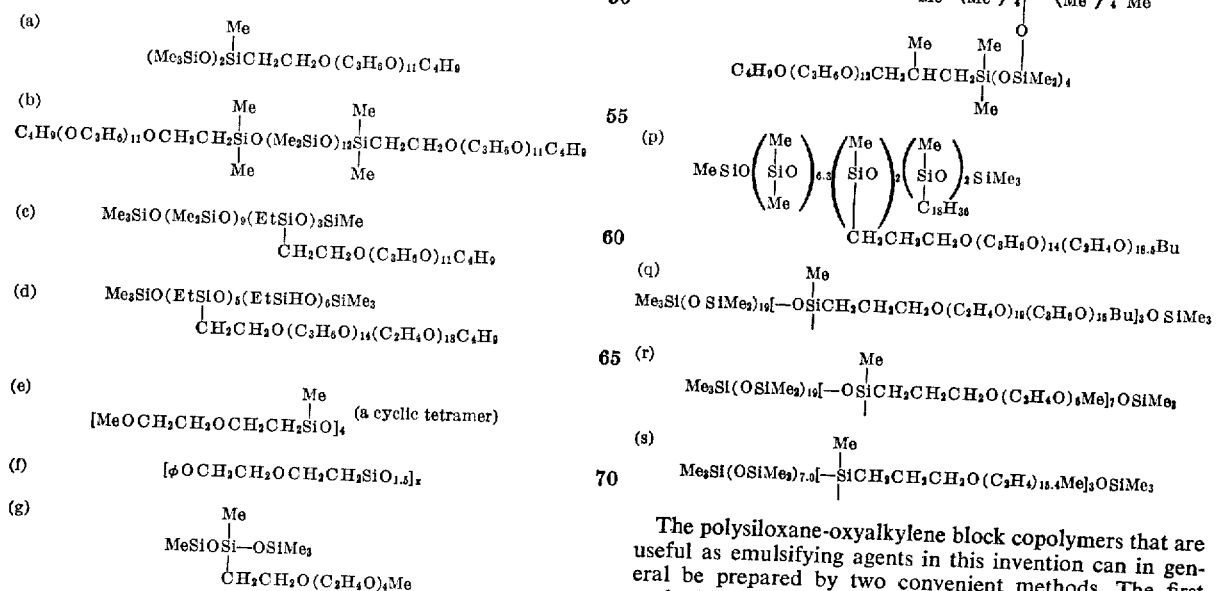

The polysiloxane-oxyalkylene block copolymers that are useful as emulsifying agents in this invention can in general be prepared by two convenient methods. The first method, known as the metathesis process, involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer. This process can be illustrated by the following equation:

(7)
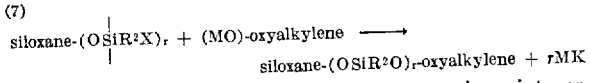
siloxane-$(O\overset{|}{\underset{|}{Si}}R^2X)_r$ + (MO)-oxyalkylene ⟶
  siloxane-$(OSiR^2O)_r$-oxyalkylene + rMK wherein $R^2$ is a divalent hydrocarbon group, $r$ is an integer that has a value of at least 1 and preferably 1 to about 4, X is a halogen atom, M is an alkali metal, siloxane denotes a siloxane block and oxyalkylene denotes an oxyalkylene block.

The second method, known as the addition process, involves forming a mixture of an organo-siloxane polymer containing a hydrogen-siloxy group i.e., a

H$\overset{|}{\underset{|}{Si}}$O group, an oxyalkylene polymer containing an alkenyloxy end-blocking or chain terminating group and a platinum catalyst and heating the mixture to a temperature sufficiently elevated to cause the siloxane polymer and the oxyalkylene polymer to react to produce the copolymer. This process can be illustrated by the following equation:

(8)
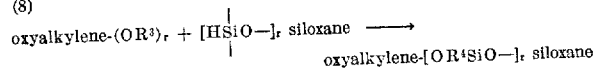
oxyalkylene-$(OR^3)_r$ + $[H\overset{|}{\underset{|}{Si}}O—]_r$ siloxane ⟶
  oxyalkylene-$[OR^4SiO—]_r$ siloxane wherein oxyalkylene, siloxane and $r$ have the meaning defined for Formula 7, $OR^3$ is an alkenyloxy group (such as the vinyloxy and the allyloxy groups) and $R^4$ is an alkylene group containing at least two successive carbon atoms.

When the polysiloxane-oxyalkylene block copolymer contains silicon-bonded hydrogen atoms, i.e., contains two units represented by Formula 2 hereinabove, the addition process is preferable. If the metathesis process is used, many of the silicon-bonded hydrogen atoms will react with the alkali metal ions present in the reaction mixture.

When the copolymer useful in this invention contain olefinically unsaturated groups attached to silicon (for example, when R in Formulas 1 or 2 above, is alkenyl or cycloalkenyl such as vinyl or cyclohexenyl) it is preferable to prepare these copolymers by addition of the alkenyloxy-end-blocked oxyalkylene polymer to a monomeric, hydrolyzable silane containing silicon-bonded hydrogen, followed by co-hydrolysis or co-condensation with other hydrolyzable silanes containing silicon-bonded hydrogen and silicon-bonded olefinically unsaturated hydrocarbon groups using conventional techniques known to those versed in the art. For example, reactions of $$CH_2=CHCH_2(OC_2H_4)_6—OCH_3$$

with $CH_3SiHCl_2$ in the presence of a platinum catalyst followed by cohydrolysis of the product with $$CH_2=CHSi(CH_3)Cl_2$$

$CH_3SiHCl_2$, and $(CH_3)_3SiCl$ gives a copolymer of this invention containing units having the formulas $$[CH_3O(C_2H_4O)_6CH_2CH_2CH_2Si—(CH_3)O]$$

$[CH_2=CHSi(CH_3)O]$, and $[CH_3SiHO]$, end-blocked with $[(CH_3)_3SiO]$ groups.

The useful waxes in the polish formulations of this invention include both natural and synthetic waxes, for example, high molecular weight polyoxyalkylene glycols, beeswax, carnauba wax, ozokerite, microcrystalline hydrocarbon waxes, chlorinated paraffin waxes, petroleum waxes, aliphatic hydrocarbon waxes prepared by the Fischer-Tropsch process, hydrogenated castor oil, myristic acid, palm wax, polyolefin waxes, polyacrylate waxes, acrylate-styrene copolymeric waxes, and the like.

Any liquid organic compound which does not significantly attack the surface to be polished and which does not react with any of the optional ingredients in the polish formulations of this invention can be employed. The preferred liquid organic compounds are aliphatic hydrocarbons such as hexane, cyclohexane, iso-octane, petroleum ether, mineral spirits (a mixture of aliphatic hydrocarbons obtained by the distillation of petroleum), decane, turpentine, and the like.

In many instances the inert liquid organic compounds are not solvents for many of the operable waxes described hereinabove, but rather small particles of wax are dispersed and/or suspended in the liquid organic compound.

The abrasive cleansers useful in the polish formulations of this invention include, for example, finely-divided silica, finely-divided clay, diatomaceous earth, pumice, and the like.

Other optional ingredients in the polish formulations of this invention include, wetting agents such as

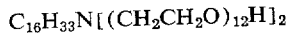
$$C_{16}H_{33}N[(CH_2CH_2O)_{12}H]_2$$

and,
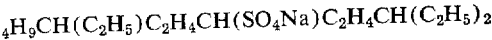
$$C_4H_9CH(C_2H_5)C_2H_4CH(SO_4Na)C_2H_4CH(C_2H_5)_2$$

stabilizers such as triethanolamine lauryl sulfate, polyacrylic acid, carboxymethyl cellulose and the alkyl phenyl ethers of polyoxyalkylene glycols; emulsifying and dispersion agents of the non-ionic, cationic, and anionic types such as triethanolamine, propanolamine, morpholine, oleic acid, stearic acid, polypropylene glycol monobutyl ether, polyethylene glycol 2-ethylhexyl ether and polyethylene glycol monobutyl ether; esters of polyhydric alcohols such as glycerol monostearate, polyoxyethylenedistearate and propylene glycol monolaurate, or substances such as polyvinyl alcohol; and when the polish formulation is to be used in the form of an aerosol spray, gaseous propellants such as carbon dioxide or a conventional halogenated hydrocarbon propellant.

The polish formulations of this invention can be prepared by conventional procedures, the exact procedure depending on the nature and number of ingredients in the formulation. When the formulation is to contain only the polysiloxane-oxyalkylene block copolymer, wax and liquid organic compound, the three ingredients are conveniently combined and heated with agitation at temperatures between about 125° F. and 175° F. until a solution or uniform dispersion is obtained. Rapid cooling then produces a fine, uniform dispersion of the wax. When the formulation is to contain in addition, for example, an abrasive, water and an emulsifying agent, it is convenient to add the solution or dispersion prepared as above to a slurry of the abrasive cleanser and emulsifying agent in the water, agitation being maintained during the addition and subsequent cooling of the final formulation.

The polish formulations of this invention give best results when the polysiloxane-oxyalkylene block copolymer and the wax are highly incompatible. Since the molecules of most waxes contain long hydrocarbon chains, the greatest degree of incompatibility is obtained when the organic groups attached to the silicon atoms in the siloxane blocks of the copolymer (that is, the R groups of Formulas 1 and 2 above) are short chain hydrocarbon groups, preferably methyl groups.

When the surfaces to which the polish formulations of this invention are to be applied will be exposed to water, it is preferable to employ a polysiloxane-oxyalkylene block copolymer which is water insoluble. The block copolymers useful in this invention are in general water insoluble when the total molecular weight of the siloxane is large, when the R groups in Formulas 1 and 2 above are relatively long chain and when, in each oxyalkylene chain in the oxyalkylene blocks, less than about 30 percent of the total number of oxyalkylene groups are oxyethylene groups.

It will be apparent that the polish formulations of this invention can contain only a polysiloxane-oxyalkylene block copolymer or mixture of such copolymers, or can contain only an inert liquid organic compound in addition to the copolymer. However, it is preferable to employ the combination of polysiloxane-oxyalkylene block copolymer, wax and inert liquid organic compound.

The polish formulations of this invention, when applied to metallic surfaces, such as chromium, silver or nickel surfaces, or to painted, varnished or lacquered surfaces, provide protective films which have a high gloss, are water repellent and resistant to oxidation and weathering. Particularly advantageous is the reduced tendency of the film forming ingredients to migrate from the metallic, painted, varnished or lacquered surface to other nearby metal or glass surfaces.

The polish formulations of this invention also show a reduced tendency to slip. That is, when employed as furniture polish, or more particularly as floor polishes, there is little tendency for objects or pedestrians to slip on the polished surface.

A further advantage resulting from the use of the polish formulations of this invention is that the polished surfaces can be easily repainted (or revarnished or relacquered) without requiring special care in removing the polish film, a solvent wash being sufficient to remove the polish film.

The following examples are presented:

Example 1

An emulsion polish-cleanser is prepared from the following ingredients:

| | Weight percent |
|---|---|
| A water-insoluble polysiloxane-oxyalkylene block copolymer having a viscosity of 2,326 centistokes at 25° C., and having the average formula: $$\left[\begin{array}{c} C_2H_5 \\ -Si-O-Si-CH_2CH_2O(CH_2CH_2O)_{19}C_8H_{16}OCH_2CH_2-Si-O- \\ H \quad O \quad\quad\quad\quad\quad\quad\quad\quad\quad\quad\quad\quad\quad\quad\quad\quad\quad\quad\quad\quad O \\ Si(CH_3)_3 \quad\quad\quad\quad\quad\quad\quad\quad\quad\quad\quad\quad\quad\quad\quad\quad Si(CH_3)_3 \end{array}\right]$$ with $C_2H_5$ substituents | 5 |
| A microcrystalline hydrocarbon wax | 2 |
| Oleic acid (emulsifying agent) | 2 |
| Diatomaceous earth | 10 |
| Morpholine (emulsifying agent) | 1 |
| Mineral Spirits | 40 |
| Water | 40 |

The water, diatomaceous earth and morpholine are combined and mixed at room temperature to form a slurry. The remaining ingredients are combined and are heated at about 160° F. until a clear solution is obtained. This solution while hot, is added to the slurry with vigorous agitation. Agitation is continued until the final mixture has cooled to room temperature.

Example 2

A paste-type polish is prepared from the following ingredients:

| | Weight Percent |
|---|---|
| A polysiloxane-oxyalkylene block copolymer having the average formula: $$Me_3SiO\left(\begin{array}{c}Me\\|\\SiO\\|\\Me\end{array}\right)_{42}\left(\begin{array}{c}Me\\|\\SiO\\|\\CH_2CH_2CH_2O(C_2H_4O)_8(C_3H_6O)_{20}Bu\end{array}\right)_{1.7}SiMe_3$$ | 10 |
| Petroleum Wax | 18 |
| Carnauba Wax | 7 |
| Mineral Spirits | 65 |

The waxes, polysiloxane-oxyalkylene block copolymer and a small amount of mineral spirits are combined and heated to about 175° F. until the waxes are melted. The remainder of the mineral spirits is then added with agitation and agitation is continued until the mixture has cooled to about 120° F. The mixture is then poured into containers where it solidifies on cooling to room temperature.

Example 3

A polish is prepared from the following ingredients:

| | Weight Percent |
|---|---|
| A polysiloxane-oxyalkylene block copolymer having the average formula: $$Me_3SiO\left(\begin{array}{c}Me\\|\\SiO\\|\\Me\end{array}\right)_{17}\left(\begin{array}{c}Me\\|\\SiO\\|\\CH_2CH_2CH_2O(C_3H_6O)_{14}(C_2H_4O)_{18.5}Bu\end{array}\right)_{3.1}SiMe_3$$ | 2 |
| A microcrystalline hydrocarbon wax | 4 |
| Aliphatic hydrocarbon solvent mixture having a boiling point above about 175° F. | 94 |

The wax, polysiloxane-oxyalkylene block copolymer and about one third of the hydrocarbon mixture are heated to about 160° F. The remaining hydrocarbon mixture is added with stirring. The mixture is then cooled rapidly with vigorous agitation to give a fine suspension of wax particles in the copolymer-hydrocarbon solution.

*Example 4*

When a polysiloxane-oxyalkylene block copolymer having the formula:

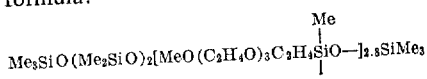

is substituted for the block copolymer of Example 3, another polish of this invention is obtained wherein the copolymer functions as a leveling agent and an adhesion promoter.

What is claimed is:

1. A polish which comprises (A) as the sole polysiloxane containing constituent from about 0.1 to about 98 weight percent of a polysiloxane-oxyalkylene block copolymer consisting essentially of (1) at least one siloxane block containing at least two siloxane units represented by the formula $$R_bSiO_{4-b/2}$$

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, said siloxane block containing at least one of said siloxane units wherein at least one R group is a divalent hydrocarbon group, and (2) at least one oxyalkylene block containing at least two oxyalkylene groups represented by the formula —R′O—, wherein R′ is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 50 weight percent of a wax and (C) from about zero to about 97.9 weight percent of an inert liquid organic compound.

2. A polish which comprises (A) as the sole polysiloxane containing constituent from about 0.1 to about 98 weight percent of a polysiloxane-oxyalkylene block polymer consisting essentially of (1) at least one siloxane block containing at least two siloxane units represented by the formula $$R_bSiO_{4-b/2}$$

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, said siloxane block containing at least one of said siloxane units wherein at least one R group is a divalent hydrocarbon group, and (2) at least one oxyalkylene block containing at least four oxyalkylene groups represented by the formula —R′O—, wherein R′ is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 50 weight percent of a wax and (C) from about zero to about 97.9 weight percent of an inert liquid organic compound.

3. A polish which comprises (A) as the sole polysiloxane containing constituent from about 0.1 to about 20 weight percent of a polysiloxane-oxyalkylene block copolymer consisting essentially of (1) at least one siloxane block containing at least two siloxane units represented by the formula $$R_bSiO_{4-b/2}$$

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, said siloxane block containing at least one of said siloxane units wherein at least one R group is a divalent hydrocarbon group, and (2) at least one oxyalkylene block containing at least four oxyalkylene groups represented by the formula —R′O—, wherein R′ is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 25 weight percent of a wax and (C) from about 55 to about 97.9 weight percent of an inert liquid organic compound.

4. A polish which comprises (A) as the sole polysiloxane containing constituent from about 0.1 to about 98 weight percent of a polysiloxane-oxyalkylene block copolymer consisting essentially of (1) at least one siloxane block containing at least two siloxane units represented by the formula $$R_bSiO_{4-b/2}$$

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, and at least one siloxane unit represented by the formula $$R_eSiO_{\frac{4-e-f}{2}}^{H_f}$$

wherein R has the meaning defined hereinabove, $e$ has a value from 0 to 2, $f$ has a value from 1 to 2, and $e$ plus $f$ has a value from 1 to 3, said siloxane block containing at least one of said siloxane units wherein at least one R group is a divalent hydrocarbon group, and (2) at least one oxyalkylene block containing at least four oxyalkylene groups represented by the formula —R′O—, wherein R′ is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 50 weight percent of a wax and (C) from about zero to about 97.9 weight percent of an inert liquid organic compound.

5. A polish which comprises (A) as the sole polysiloxane containing constituent from about 0.1 to about 98 weight percent of a polysiloxane-oxyalkylene block copolymer that consists essentially of units represented by the formula $$G'''(OG'')_nOG'SiO_{\frac{3-c}{2}}^{G_c}$$

wherein G contains from about one to about twenty carbon atoms and is selected from the class consisting of monovalent hydrocarbon radicals and halogen-substituted monovalent hydrocarbon radicals, G′ is a divalent hydrocarbon radical containing from one to about twenty carbon atoms, G″ is an alkylene radical containing from two to about ten carbon atoms, G‴ is selected from the group consisting of a hydrogen atom and monovalent hydrocarbon radicals free from aliphatic unsaturation and containing from one to about twelve carbon atoms, $n$ is an integer having a value of from 4 to 30, and $c$ has a value from 0 to 2, and said siloxane blocks constituting from 5 to 50 parts by weight and said oxyalkylene blocks constituting from 50 to 95 parts by weight per 100 parts by weight of the copolymer, (B) from at least 2 to about 50 weight percent of a wax and (C) from about zero to about 97.9 weight percent of an inert liquid organic compound.

6. A polish which comprises (A) as the sole polysiloxane containing constituent from about 0.1 to about 98 weight percent of a polysiloxane-oxyalkylene block copolymer consisting essentially of units represented by the formula $$[G'''(OG'')_nOG']_2SiO_{2-c/2}$$

wherein G contains from one to about twenty carbon atoms, and is selected from the class consisting of monovalent hydrocarbon radicals and halogen-substituted monovalent hydrocarbon radicals G' is a divalent hydrocarbon radical containing from one to about twenty carbon atoms, G'' is an alkylene radical containing from two to about ten carbon atoms, G''' is selected from the group consisting of a hydrogen atom and monovalent hydrocarbon radicals free of aliphatic unsaturation and containing from one to about twelve carbon atoms, $n$ is an integer having a value from 4 to 30, $c$ has a value from 0 to 1, ond said siloxane blocks constituting from 5 to 50 parts by weight and said oxyalkylene blocks constituting from 50 to 95 parts by weight per 100 parts by weight of the copolymer, (B) from at least 2 to 50 weight percent of a wax (C) from about zero to about 97.9 weight percent of an inert liquid organic compound.

7. A polish which comprises (A) as the sole polysiloxane containing constituent from about 0.1 to about 98 weight percent of a polysiloxane-oxyalkylene block copolymer consisting essentially of (1) at least one siloxane block containing at least two siloxane units represented by the formula $$R_bSiO_{4-b/2}$$

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, said siloxane block containing at least one of said siloxane units wherein at least one R group is a divalent hydrocarbon group, and (2) at least one oxyalkylene block containing at least four oxyalkylene groups represented by the formula —R'O—, wherein R' is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 50 weight percent of a wax, (C) from about zero to about 97.9 weight percent of an inert liquid organic compound, (D) from about zero to about 30 weight percent of an abrasive cleanser and (E) from about zero to about 99 weight percent water.

8. A polish which comprises (A) as the sole polysiloxane containing constituent from about 0.1 to about 20 weight percent of a polysiloxane-oxyalkylene block copolymer that consists essentially of (a) units represented by the formula

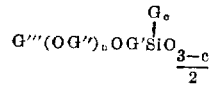

wherein G contains from about one to about twenty carbon atoms and is selected from the class consisting of monovalent hydrocarbon radicals and halogen-substituted monovalent hydrocarbon radicals, G' is a divalent hydrocarbon radical containing from one to about twenty carbon atoms, G'' is an alkylene radical containing from two to about ten carbon atoms, G''' is selected from the group consisting of a hydrogen atom and monovalent hydrocarbon radicals free from aliphatic unsaturation and containing from one to about twelve carbon atoms, $n$ is an integer having a value of from 2 to 30, and $c$ has a value from 0 to 2 and (b) units represented by the formula $$R_bSiO_{4-b/2}$$

wherein R is a monovalent hydrocarbon group and $b$ has a value from 1 to 3 inclusive, and said siloxane blocks constituting from 5 to 50 parts by weight and said oxyalkylene blocks constituting from 50 to 95 parts by weight per 100 parts by weight of the copolymer, (B) from at least 2 to about 25 weight percent of a wax and (C) from about 55 to about 97.9 weight percent of an inert liquid organic compound.

9. A polish which comprises (A) as the sole polysiloxane containing constituent from about 0.1 to about 20 weight percent of a polysiloxane-oxyalkylene block copolymer consisting essentially of (a) units represented by the formula $$[G'''(OG'')_nOG']_2SiO_{2-c/12}$$

wherein G contains from one to about twenty carbon atoms, and is selected from the class consisting of monovalent hydrocarbon radicals and halogen-substituted monovalent hydrocarbon radicals, G' is a divalent hydrocarbon radical containing from one to about twenty carbon atoms, G'' is an alkylene radical containing from two to about ten carbon atoms, G''' is selected from the group consisting of a hydrogen atom and monovalent hydrocarbon radicals free of aliphatic unsaturation and containing from one to about twelve carbon atoms, $n$ is an integer having a value from 2 to 30, $c$ has a value from 0 to 1 and (b) units represented by the formula $$R_bSiO_{4-b/2}$$

wherein R is a monovalent hydrocarbon group and $b$ has a value from 1 to 3 inclusive, and said siloxane blocks constituting from 5 to 50 parts by weight and said oxyalkylene blocks constituting from 50 to 95 parts by weight per 100 parts by weight of the copolymer, (B) from at least 2 to 25 weight percent of a wax (C) from about 55 to about 97.9 weight percent of an inert liquid organic compound.

10. A polish which comprises (A) as the sole polysiloxane containing constituent from about 0.1 to about 20 weight percent of a polysiloxane-oxyalkylene block copolymer consisting essentially of (1) at least one siloxane block containing at least two siloxane units represented by the formula $$R_bSiO_{4-b/2}$$

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, said siloxane block containing at least one of said siloxane units wherein at least one R group is a divalent hydrocarbon group, and (2) at least one oxyalkylene block containing at least four oxyalkylene groups represented by the Formula —R'O—, wherein R' is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 25 weight percent of a wax selected from the group consisting of high molecular weight polyoxyalkylene glycols, beeswax, carnauba wax, ozokerite, microcrystalline hydrocarbon waxes, chlorinated paraffin waxes, petroleum waxes, aliphatic hydrocarbon waxes prepared by the Fischer-Tropsch process, hydrogenated castor oil, myristic acid, palm wax, polyolefin waxes, polyacrylate waxes and acrylate-styrene copolymeric waxes and (C) from about 55 to about 97.9 weight percent of an inert liquid organic compound.

11. A polish which comprises (A) as the sole polysiloxane containing constituent from about 0.1 to about 20 weight percent of a polysiloxane-oxyalkylene block copolymer that consists essentially of (a) units represented by the formula

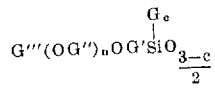

wherein G contains from about one to about twenty carbon atoms and is selected from the class consisting of monovalent hydrocarbon radicals and halogen-substituted monovalent hydrocarbon radicals, G' is a divalent hydrocarbon radical containing from one to about twenty carbon atoms, G" is an alkylene radical containing from two to about ten carbon atoms, G''' is selected from the group consisting of a hydrogen atom and monovalent hydrocarbon radicals free from aliphatic unsaturation and containing from one to about twelve carbon atoms, $n$ is an integer having a value of from 2 to 30, and $c$ has a value from 0 to 2 and (b) units represented by the formula

wherein R is a monovalent hydrocarbon group and $b$ has a value from 1 to 3 inclusive, and said siloxane blocks constituting from 5 to 50 parts by weight and said oxyalkylene blocks constituting from 50 to 95 parts by weight per 100 parts by weight of the copolymer, (B) from at least 2 to about 25 weight percent of a wax high molecular weight polyoxyalkylene glycols, beeswax, carnauba wax, ozokerite, microcystalline hydrocarbon waxes, chlorinated paraffin waxes, petroleum waxes, aliphatic hydrocarbon waxes prepared by the Fischer-Tropsch process, hydrogenated castor oil, myristic acid, palm wax, polyolefin waxes, polyacrylate waxes and acrylate-styrene copolymeric waxes, and (C) from about 55 to about 97.9 weight percent of an inert liquid aliphatic hydrocarbon.

12. A polish which comprises (A) as the sole polysiloxane containing constituent from about 0.1 to about 98 weight percent of a polysiloxane-oxyalkylene block copolymer consisting essentially of (1) at least one siloxane block containing at least two siloxane units represented by the formula

wherein each R group contains from one to about twenty carbon atoms and is selected from the class consisting of monovalent hydrocarbon groups, halogen-substituted monovalent hydrocarbon groups and divalent hydrocarbon groups and $b$ has a value from 1 to 3 inclusive, said siloxane blocks containing at least one of said siloxane units wherein at least one R group is a divalent hydrocarbon group, and (2) at least one oxyalkylene block containing at least four oxyalkylene groups represented by the formula —R'O—, wherein R' is an alkylene group containing from two to about ten carbon atoms, said siloxane and oxyalkylene blocks being interconnected by said divalent hydrocarbon group, and said siloxane blocks constituting from 5 to 50 parts by weight and said oxyalkylene blocks constituting from 50 to 95 parts by weight per 100 parts by weight of the copolymer, (B) from at least 2 to about 50 weight percent of a wax high molecular weight polyoxyalkylene glycols, beeswax, carnauba wax, ozokerite, microcrystalline hydrocarbon waxes, chlorinated paraffin waxes, petroleum waxes, aliphatic hydrocarbon waxes prepared by the Fischer-Tropsch process, hydrogenated castor oil, myristic acid, palm wax, polyolefin waxes, polyacrylate waxes and acrylate-styrene copolymeric waxes, (C) from about zero to about 97.9 weight percent of an inert liquid organic compound, (D) from about zero to about 30 weight percent of an abrasive cleanser selected from the group consisting of finely-divided clay, diatomaceous earth, and pumice, and (E) from about zero to about 99 weight percent water.

References Cited
UNITED STATES PATENTS

| | | | |
|---|---|---|---|
| 2,742,368 | 4/1956 | Rossiter et al. | 106—10 |
| 2,846,458 | 8/1958 | Haluska | 260—448.2 |
| 2,868,824 | 1/1959 | Haluska | 260—448.2 |

ALEXANDER H. BRODMERKEL, *Primary Examiner.*

L. B. HAYES, *Assistant Examiner.*